United States Patent

Endo et al.

[15] 3,658,522
[45] Apr. 25, 1972

[54] MEROCYANINE-SENSITIZED ZINC OXIDE PHOTOCONDUCTIVE ELEMENT

[72] Inventors: Katutoshi Endo, Yokoyama-shi; Isao Tashiro, Tokyo, both of Japan

[73] Assignee: Kabushiki Kaisha Ricoh, Tokyo, Japan

[22] Filed: May 12, 1969

[21] Appl. No.: 823,815

[30] Foreign Application Priority Data

May 15, 1968  Japan..................................43/32229

[52] U.S. Cl..............................96/1.7, 96/1.6, 260/240.4
[51] Int. Cl. ......................................................G03g 7/00
[58] Field of Search....................96/1.5, 1.6, 1.7, 102, 106; 260/240.5

[56] References Cited

UNITED STATES PATENTS

| | | | |
|---|---|---|---|
| 2,170,804 | 8/1939 | Brooker | 260/240 |
| 2,241,238 | 5/1941 | Brooker | 260/240 |
| 3,288,610 | 11/1966 | Götze et al. | 96/106 |

FOREIGN PATENTS OR APPLICATIONS 1,098,538  1/1968  Great Britain............................96/1.6

OTHER PUBLICATIONS

Rosewoff et al., The Resolved Spectra of Small Cyanine Dye Aggregates and a Mechanism of Super Sensitization, pp. 185–190, Photographic Science and Engineering, Vol. 12, No. 4, July–August, 1968).

Primary Examiner—George F. Lesmes
Assistant Examiner—M. B. Wittenberg
Attorney—Woodhams, Blanchard & Flynn

[57] ABSTRACT

An electrophotographic copying material comprising a support and a photoconductive layer which is formed on one surface of said support and consisting substantially of an electrically insulating resinous binder having suspended therein a finely-divided photoconductive substance and a merocyanine dye as a sensitizer, said dye being expressed by the formula:

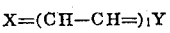

wherein $X=$ represents a divalent radical selected from the group consisting of

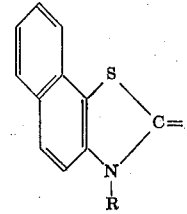

(which means β-naphthothiazole radical and R represents a monovalent radical selected from the group consisting of methyl, ethyl, propyl, butyl and amyl radicals), and

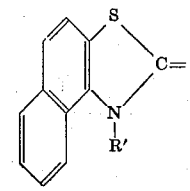

(which means α-naphthothiazole radical, and R' represents a radical identical with that of said R), Y represents a divalent radical selected from the group consisting of

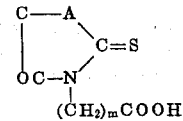

(A represents a radical selected from the group consisting of oxygen and sulfur, and $m$ is a numeral of 0 to 3.)

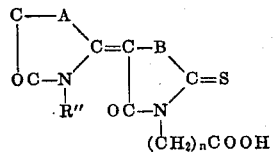

(R'' represents a radical identical with that of said R, B represents a radical identical with that of said A, and $n$ is a numeral of 0 to 3.) and

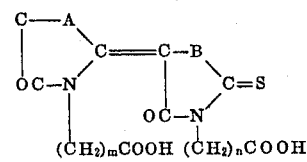

and $l$ represents a numeral of 0 to 4.

2 Claims, 1 Drawing Figure

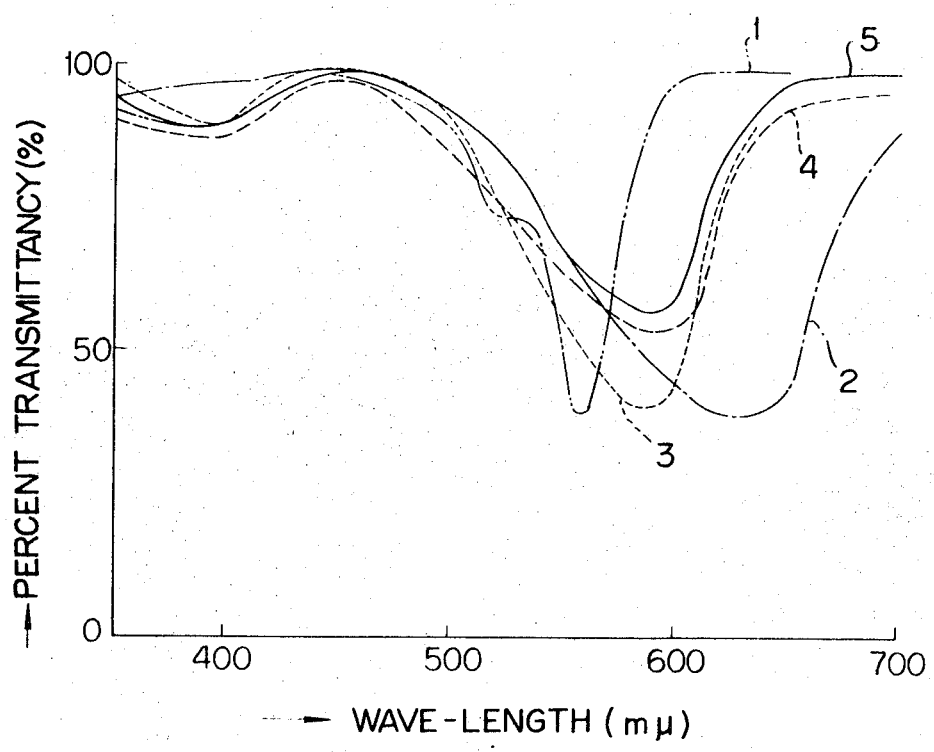
INVENTORS
KATUTOSHI ENDO
ISAO TASHIRO

MEROCYANINE-SENSITIZED ZINC OXIDE PHOTOCONDUCTIVE ELEMENT

BACKGROUND OF THE INVENTION

1. Field of the Invention

The present invention relates to an electrophotographic copying material in whose photoconductive layer is contained a merocyanine dye expressed by a special formula as a sensitizer.

2. Description of the Prior Art

An electrophotographic copying material is prepared by forming a photoconductive layer comprising a resinuous binder which contains a finely divided photoconductive substance such as zinc oxide and a sensitizer on a support of support, such as a metallic plate or paper coated with an electric conductive material. However, since the region of sensitive wave length of zinc oxide lies in the ultraviolet band (380 μ), the optical system inclusive of light sources, lenses, etc. required for forming a latent image on such a copying material by an exposure is necessarily subject to various restrictions, which have usually been avoided by conducting the optical sensitization.

As the sensitizers to be used for conducting the optical sensitization, dyes are generally used and Rose Bengal, fluorescein, Eosine, Tetrabromophenol Blue, Acridine yellow, Erythrosine. Methylene Blue, Rhodamine and the like are widely known. These dyes are adsorbed to zinc oxide and shift its sensitive range to the visible light band in response to the absorbancy of the respective dyes, thus making the zinc oxide sensitive to visible light. These dyes, however, have such a narrow range of wave length to absorb the visible rays that it requires an addition of a great quantity of the dye to obtain the sensitizing effect satisfactorily, but the addition of too much dye inevitably develops a defect of causing a heavy coloring of the copying material.

A sensitizer that gives as little coloring as possible and has its absorption band for wave length within the range of wave length of visible rays and has a great sensitizing effect when used in the photoconductive layer is desirable as a sensitizer for an electrophotographic use. As none of the aforementioned sensitizers satisfies such requirements when used alone, two or three of them are mixed at a suitable ratio to prepare a sensitizer which is apparently light-colored when contained in the photoconductive layer. However, sensitizers having a proper range of wave length of the visible rays and a marked sensitizing effect at the same time are hard to obtain and prepare.

As mentioned in the foregoing, the conventional electrophotographic copying materials are not only somewhat colored due to the dyes contained in the photoconductive layer for sensitizing purpose but also are far from satisfactory so far as their light sensitivity is concerned.

SUMMARY OF THE INVENTION

The object of the present invention is to provide electrophotographic copying materials which have an excellent light sensitivity and whose photoconductive layer is perfectly uncolored. This invention is based on the knowledge developed from the findings of the inventors that a merocyanine dye expressed by the undermentioned general formula is adsorbed very satisfactorily by such photoconductive substances as zinc oxide, titanium oxide, zinc sulfide, etc. that are used as electrophotographic copying materials and acts as an exceedingly excellent sensitizer for these photoconductive substances:

General formula $$X=(CH-CH=)_l Y$$

wherein X= represents a divalent radical selected from the group consisting of

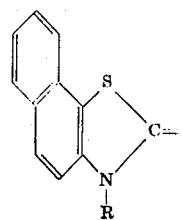

(which means β-naphthothiazole radical and R represents a monovalent radical selected from the group consisting of methyl, ethyl, propyl, butyl and amyl radicals), and

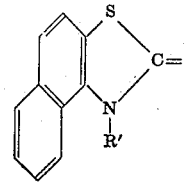

(which means α-naphthothiazole radical, and R' represents a radical identical with that of said R), Y represents a divalent radical selected from the group consisting of

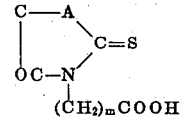

(A represents a radical selected from the group consisting of oxygen and sulfur, and $m$ is a numeral of 0 to 3.)

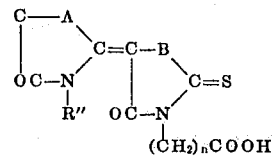

(R'' represents a radical identical with that of said R, B represents a radical identical with that of said A, and $n$ is a numeral of 0 to 3.) and

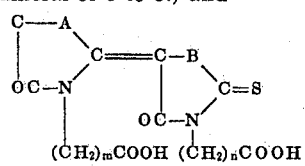

and $l$ represents a numeral of 0 to 4.

Four specific examples of these sensitizers are given by way of concrete example in the following:

(a)
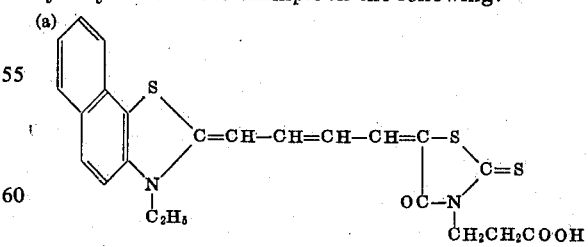
(Melting point: 255° C.)

(b)
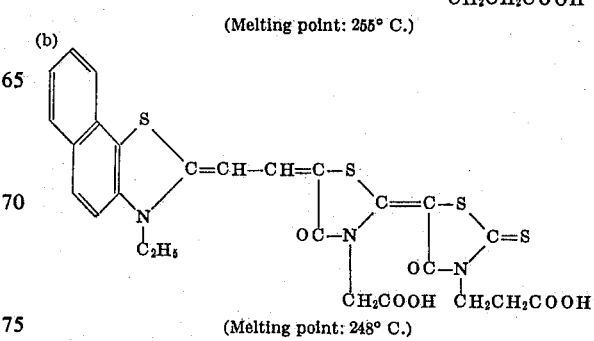
(Melting point: 248° C.)

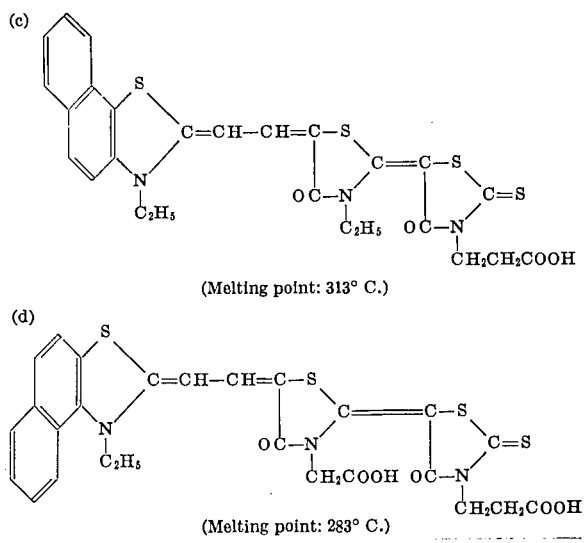

(c) (Melting point: 313° C.)

(d) (Melting point: 283° C.)

Incidentally, these merocyanine dyes can be synthesized easily according to an ordinary method of synthesis, for instance, by first making rhodamine into aminobutadienylidene, which, after acetylation, is then made to react with the quaternary salt of naphthothiazole by the use of triethylamine.

According to the present invention, a varied region of sensitive wave length of the photoconductive layer can be obtained by substituting $l$ with a required value in the aforementioned general formula representing a merocyanine dye to be contained in the photoconductive layer of a copying material. For instance, the photoconductive layer which contains a dye expressed by the chemical formula (a), when the value of $l$ is 0 in the said formula (in this case, the dye is a compound in which the X radical is directly combined with the Y radical), has a maximum absorption of the range of the sensitive wave length at the point of 4270 A., and as the value of $l$ increases by one in such a way like 1, 2, 3, 4 . . . . . the position of said maximum absorption moves towards the long wave length side by approximately 1000 A. Though the range of the sensitive wave length scarcely changes when the values of $n$ and $m$ (in case where both $n$ and $m$ are 0, COOH is combined directly with an N-atom) are varied respectively, the dark decay character of the copying material is improved if the dye is contained in the photoconductive layer.

Furthermore, these merocyanine dyes have to great adsorption-character for photoconductive substances, for instance, such as zinc oxide, in other words, even a very small quantity of the dye, when added to zinc oxide, reveals an excellent effect of sensitizing zinc oxide by being well adsorbed to the surface of the finely divided zinc oxide.

Table 1 shows the adsorption-character of these merocyanine dyes to zinc oxide as compared with the adsorption-character of Rose Bengal, which has been regularly used in this technical field, to zinc oxide. This comparison was conducted by actually measuring the quantity of the respective dyes (the dyes (a) and (b) in the concrete examples mentioned hereinbefore and Rose Bengal) adsorbed to the surface of zinc oxide particles, which had been added in a fixed quantity to the solutions of methanol in which a certain amount of the dyes had been dissolved respectively.

TABLE 1

| Amount of added dye (mole/lg. ZnO) | Amount of adsorbed Rose Bengal (mole/ lg. ZnO) | Amount of adsorbed merocyanine dye having the formula (a) (mole/lg. ZnO) | Amount of adsorbed merocyanine dye having the formula (b) (mole/lg. ZnO) |
|---|---|---|---|
| $4 \times 10^{-7}$ | $0.37 \times 10^{-6}$ | $0.41 \times 10^{-6}$ | $0.39 \times 10^{-6}$ |
| $1 \times 10^{-6}$ | $0.57 \times 10^{-6}$ | $0.95 \times 10^{-6}$ | $0.99 \times 10^{-6}$ |
| $2 \times 10^{-6}$ | $0.85 \times 10^{-6}$ | $2.0 \times 10^{-6}$ | $2.0 \times 10^{-6}$ |
| $3 \times 10^{-6}$ | $1.77 \times 10^{-6}$ | $2.9 \times 10^{-6}$ | $3.1 \times 10^{-6}$ |

BRIEF DESCRIPTION OF THE DRAWING

The results obtained from the comparison of the light absorption measured with the respective solutions prepared by dissolving $4 \times 10^{-9}$ mol. of each dye in 1cc of methanol, where each of the merocyanine dyes having chemical formula of (a), (b), (c) and (d) mentioned in the foregoing and Rose Bengal which has been conventionally known as a sensitizer shall be explained referring to the attached figure. The FIGURE gives curves to show the light absorption of the respective dyes, where curve 1 shows the light absorption of Rose Bengal and curves 2–5 show the light absorption of the respective merocyanine dyes; more particularly, curve 2 shows the light absorption of the merocyanine dye expressed by the formula (a), curve 3 similarly by the formula (b), curve 4 by the formula (c), and curve 5 by the formula (d).

In the figure, the transmittancy of the methanol solution which contains the dye is scaled on the axis of ordinate and the wave length of the light transmitted through the aforementioned solution is scaled on the axis of abscissa. The percent transmittancy of the light of the respective wave length was measured by analyzing these dye solutions according to the ordinary light absorption analysis.

As clearly observed from the figure, the respective merocyanine dyes (curves 2–5) have the range of wave length of light absorption wider than that of Rose Bengal (curve 1) and their maximum percent transmittancy is nearly of the same degree as that of Rose Bengal. The range of wave length of light absorption of the merocyanine dyes thus exists in the area of broader wave length than that of Rose Bengal. The properties of the merocyanine dyes mentioned in the foregoing have a noteworthy effect on developing the advantages that the photoconductive layer of the electrophotographic copying material can be sensitized promptly by the use of the ordinary visible rays and that the sensitizing speed can be increased at the same time.

The aforementioned sensitizer of merocyanine dyes can be used in combination with the support, various types of electrically insulating resinous binders and many kinds of photoconductive substances all of which have hitherto been used as materials of electrophotographic copying material. However, zinc oxide is most suitable for the photoconductive substance. These sensitizers produce an effect satisfactory enough when added in an amount ranging from $0.01 \times 10^{-6}$ mol. to $2 \times 10^{-6}$ mol. per 1g of the photoconductive substance contained in the photoconductive layer of the electrophotographic copying materials. The amount of the sensitizer, when added in the aforementioned range, does not allow the photoconductive layer to be colored; therefore, in case where the copying materials which have been prepared by forming a photoconductive layer on the surface of the support according to the present invention are used in the practical copying process, there is an advantage that a very clear copied image is obtained therewith.

DESCRIPTION OF THE PREFERRED EMBODIMENTS

EXAMPLE 1

A photoconductive layer forming solution consisting of the following materials:

| | |
|---|---|
| zinc oxide | 50 parts by weight |
| silicone resin | 10 parts by weight |
| methanol | 3 parts by weight |
| triethylamine | 0.05 part by weight |
| merocyanine dye | 0.0585 part by weight |
| ( as per formula ($a$) ) | (the amount is equal to $0.25 \times 10^{-6}$ mol to 1g of zinc oxide) |
| toluene | 200 parts by weight | was fully mixed in the ball mill to complete the suspension. The suspension was then applied to the surface of a support of aluminum plate to form a coating having a thickness of $15\mu$ and was dried in heated air at 110° C for 10 minutes to prepare an electrophotographic copying material. Incidentally, triethylemine contained in the abovementioned photoconductive layer forming solution was added to the composition with the purpose of improving the solubility of the merocyanine dye in methanol. After the copying material thus prepared was kept in the dark environment at the temperature of 20° C. and R.H. of 60% for 20 hours or more for adaptation, its photoconductive layer was charged with an electrostatic charge by means of a corona discharge.

To make a comparative test of the copying materials, a photoconductive layer forming solution consisting of the same components as mentioned in the foregoing except that the merocyanine dye was replaced by Rose Bengal and one more photoconductive layer forming solution consisting of the same components as mentioned in the foregoing except that the dye was omitted from the composition were prepared. Electrophotographic copying materials were prepared by the use of these solutions respectively, and they had their photoconductive layers charged with an electrostatic charge. The electrostatic characteristics of the respective copying materials were measured and the results were obtained as given in Table 2.

TABLE 2

| Electrostatic characteristics | Dyes | | |
|---|---|---|---|
| | No dyes used | Rose Bengal | Merocyanine dye (a) |
| Charge acceptance (V.) | [1] 600 | [1] 600 | [1] 550 |
| Dark decay (V.) | [1] 60 | [1] 90 | [1] 100 |
| Overcharge | | | |
| Light sensitivity | [2] 1,050 | [2] 65 | [2] 26 |

[1] Approximately.
[2] Lux.-sec.

In Table 2, the surface potential of charge accepted on the photoconductive layer indicates the saturated potential when the photoconductive layer of the copying material was charged with an electrostatic charge by means of a 6.5 KV corona discharge; the dark-decay refers to the decay or drop of the charged potential (volt) measured when the copying material was left undisturbed in darkness for a while after its charging with the corona discharge had been stopped at the time when the saturated potential was obtained; the overcharge shows a phenomenon of the dropping of the charged potential while the corona discharge was conducted; and the light sensitivity shows the value obtained by multiplying the intensity of illumination by the time required for the charged potential dropped to half during the application of the light (exposure to the light) by the use of a tungsten-filament lamp having the color temperature of 3,000°K, after the copying material had been left undisturbed in darkness.

As Table 2 shows clearly, it can be observed that the light sensitivity of the electrophotographic copying material whose photoconductive layer contains a merocyanine dye is much more excellent as compared with that of the electrophotographic copying material whose photoconductive layer is sensitized with Rose Bengal. It was also confirmed that a very clear image was formed when a copied image was reproduced by practically using the former copying material.

EXAMPLE 2

A photoconductive layer forming solution consisting of the same components according to Example 1, excepting said merocyanine dye was replaced by a merocyanine dye expressed by the formula (b), was prepared and an electrophotographic copying material was prepared therefrom by the same process according to Example 1. The same electrostatic characteristics as mentioned in Table 2 were measured, the charge acceptance being approximately 550 (V), the dark decay 100 (V), the overcharge nil, and the light sensitivity 60 (lux. sec). When this copying material was actually used for copying, a very clear reproduction of the image was formed.

EXAMPLE 3

A photoconductive layer forming solution consisting of the following materials;

| | |
|---|---|
| zinc oxide | 50 parts by weight |
| alkyd resin | 10 parts by weight |
| pyridine | 0.05 part by weight |
| methanol | 3.0 parts by weight |
| merocyanine dye (as per formula (C) ) | 0.01 part by weight |
| toluene | 200 parts by weight | was thoroughly mixed in the ball mill, was applied to the surface of the support paper, whose reverse side was coated with an electric conductive backing, to form a coating (photoconductive layer) having a thickness of $15\mu$, and was dried at 100° C., for 2 minutes to prepare an electrophotographic copying material. This copying material was stored in the darkness at 20° C., R.H. 60%, for 20 hours or more. Its electrostatic characteristics were measured according to Examples 1 and 2 and the charge acceptance, dark decay and light sensitivity were as same as those obtained with the copying material prepared according to Example 2.

EXAMPLE 4

A photoconductive layer forming solution consisting of the following materials:

| | |
|---|---|
| zinc oxide | 50 parts by weight |
| silicone resin | 1 part by weight |
| vinyl acetate | 9 parts by weight |
| methanol | 3 parts by weight |
| triethylamine | 0.05 part by weight |
| merocyanine dye (as per formula (d) ) | 0.05 part by weight |
| toluene | 200 parts by weight | was processed according to Example 3 to prepare an electrophotographic copying material. This copying material had the same electrostatic characteristics as those of the copying material prepared according to Example 3 and it was also confirmed that a clear reproduction of the image was obtained when used in copying.

What we claim is:

1. In an electrophotographic copying material comprising a support, a photoconductive layer on one surface of said support and consisting essentially of an electrically insulating resinous binder having dispersed therein finely divided, dye-sensitized photoconductive zinc oxide, the improvement in which the dye sensitizer is a merocyanine dye of the formula:

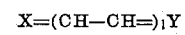

wherein X= is a divalent radical selected from the group consisting of

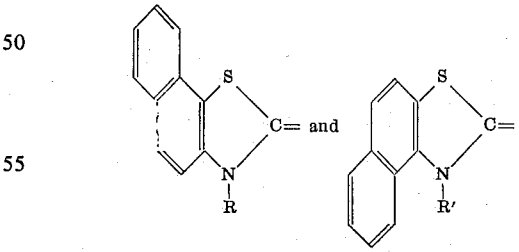

in which R and R' each is an alkyl radical of one to five carbon atoms,

Y is a divalent radical selected from the group consisting of

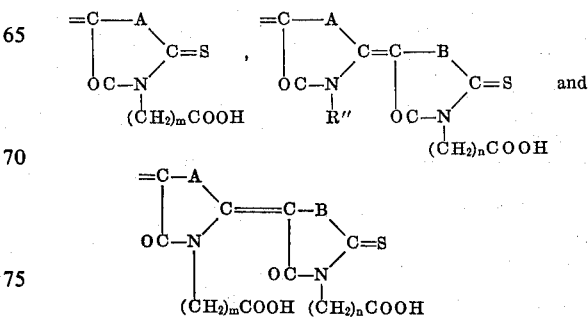

wherein A and B each is selected from the group consisting of oxygen and sulfur, R'' is an alkyl radical of one to five carbon atoms, and $n$ and $m$ each is an integer of zero to three, and $l$ is an integer of zero to four.

2. An electrophotographic copying material according to claim 1, wherein the amount of said merocyanine dye contained is said photoconductive layer is in the range of from $0.01 \times 10^{-6}$ mol to $2 \times 10^{-6}$ mol per 1 g of said zinc oxide.

* * * * *